(12) United States Patent
Rao et al.

(10) Patent No.: US 10,446,905 B2
(45) Date of Patent: Oct. 15, 2019

(54) AUTOMATIC ANTENNA ORIENTATION AND STABILIZATION SYSTEM AND METHOD

(71) Applicant: Amrita Vishwa Vidyapeetham, Tamil Nadu (IN)

(72) Inventors: Sethuraman N. Rao, Kerala (IN); Maneesha Vinodini Ramesh, Kerala (IN); P. Venkat Rangan, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 0 days.

(21) Appl. No.: 16/056,137

(22) Filed: Aug. 6, 2018

(65) Prior Publication Data

US 2018/0375187 A1 Dec. 27, 2018

Related U.S. Application Data

(63) Continuation-in-part of application No. 15/076,998, filed on Mar. 22, 2016, now Pat. No. 10,045,227.

(30) Foreign Application Priority Data

Feb. 9, 2016 (IN) .............................. 201641004600

(51) Int. Cl.
*H01Q 1/12* (2006.01)
*H04W 4/02* (2018.01)
*H01Q 3/04* (2006.01)
*H04B 7/00* (2006.01)

(52) U.S. Cl.
CPC ............. *H01Q 1/1257* (2013.01); *H01Q 3/04* (2013.01); *H04B 7/00* (2013.01); *H04W 4/023* (2013.01)

(58) Field of Classification Search
CPC .. G01C 21/165; G01C 25/005; H01Q 1/1257; H01Q 3/04; H04B 7/00; H04W 4/023
USPC ........................................................ 455/11.1
See application file for complete search history.

(56) References Cited

U.S. PATENT DOCUMENTS 10,203,207 B2 * 2/2019 Georgy ................ G01C 21/165

* cited by examiner

*Primary Examiner* — Shaima Q Aminzay
(74) *Attorney, Agent, or Firm* — Donald R. Boys; Central Coast Patent Agency, LLC

(57) ABSTRACT

A method for maximizing signal strength between a land-based or moving first station and a second, moving station on a sea-going vessel is provided, comprising mounting an antenna on a structure on the moving station, the structure rotatable about a vertical axis by a mechanism powered by an electric motor, initiating a data connection between the first and the second stations by a processor in communication circuitry at the second station, reading a received signal-strength by the processor, and operating the electric motor by the processor, rotating the rotatable structure, maximizing the signal strength.

8 Claims, 8 Drawing Sheets

AUTOMATIC ANTENNA ORIENTATION AND STABILIZATION SYSTEM AND METHOD

CROSS-REFERENCE TO RELATED DOCUMENTS

The present invention is a continuation-in-part to a patent application Ser. No. 15/076,998, filed on Mar. 22, 2016, which claims priority to Indian application 201641004600, filed Feb. 9, 2016. Disclosure of the priority documents are incorporated herein at least by reference.

BACKGROUND OF THE INVENTION

1. Field of the Invention

The present invention is in the technical area of network communications and pertains more particularly to tracking of fishing vessels from base stations on land and facilitating communication with and between vessels.

2. Description of Related Art

In many countries fishing in fresh water lakes or in the open sea, often in a loosely-defined area along a shoreline, is an important economic activity, engaging a relatively large number of fishing vessels, and employing a large number of people. In this activity there are certain dangers, which may come about because of a variety of reasons, such as equipment malfunctions or sometimes unexpected severe weather. Further, in many circumstances there is little or no ability for fishermen at sea to communicate with one another to coordinate activity, or to keep in touch with family at home, on land.

When emergencies arise, it is of course important to be able to respond to come to the aid of seafaring people whose lives and livelihood may be threatened. To do so requires knowledge of real-time location of fishing vessels and an ability to communicate with personnel aboard the vessels, and also in many cases, to communicate among different ones of the vessels as well as with at least one shore station. It is well-known, however, that equipment and techniques to accomplish such secure communication is quite expensive, and in many cases beyond the financial capability of owners of such vessels, and also of government agencies that have an interest in providing safety services.

Accordingly, what is needed is a new tracking and communication network that is far less expensive than conventional systems yet will still provide the secure tracking and communication that is needed.

BRIEF SUMMARY OF THE INVENTION

In an embodiment of the invention a method for maximizing signal strength between a land-based or moving first station and a second, moving station on a sea-going vessel is provided, comprising mounting an antenna on a structure on the moving station, the structure rotatable about a vertical axis by a mechanism powered by an electric motor, initiating a data connection between the first and the second stations by a processor in communication circuitry at the second station, reading a received signal-strength by the processor, and operating the electric motor by the processor, rotating the rotatable structure, maximizing the signal strength.

In one embodiment the method further comprises determining distance between the first and second stations by comparing location of the second station according to GPS circuitry coupled to the processor at the second station, to the location of the first land-based or moving station. Also, in one embodiment the method further comprises determining rotation direction to increase received signal strength, based at least in part on stored results of previous adjustments. And in one embodiment the method further comprises enabling the structure to be adjusted by electric motors driving a mechanism capable of adjustment in three cartesian axes, monitoring an accelerometer and a gyroscope coupled to the processor at the second station, using readings to determine pitch and roll of the second station, and driving the motors to compensate for pitch and roll determined.

In another aspect of the invention a system for maximizing signal strength between a land-based or moving first station and a second, moving station on a sea-going vessel is provided, comprising a fixed or rotatable antenna at the base station, an antenna at the second station mounted on a structure rotatable about a vertical axis by a mechanism powered by an electric motor, and control circuitry at the second station having a processor coupled to drive circuitry coupled to the electric motor, wherein the control circuitry initiates data communication between the second and the first stations, determines signal strength, and causes the antenna to rotate by driving the electric motor, maximizing the signal strength.

In one embodiment the system further comprises GPS circuitry coupled to the processor at the second station, wherein distance between the first and second stations is determined by comparing location of the second station according to GPS circuitry, to the location of the first land-based or moving base station. In one embodiment the system further comprises stored results of previous adjustments, wherein rotation direction to increase received signal strength is determined based in part on the results of previous adjustments. And in one embodiment the system further comprises electric motors driving a mechanism capable of adjusting the structure around three cartesian axes, and an accelerometer and a gyroscope coupled to the processor, wherein pitch and roll of the second station is determined using readings from the accelerometer and the gyroscope.

DETAILED DESCRIPTION OF THE INVENTION

Figure 1:
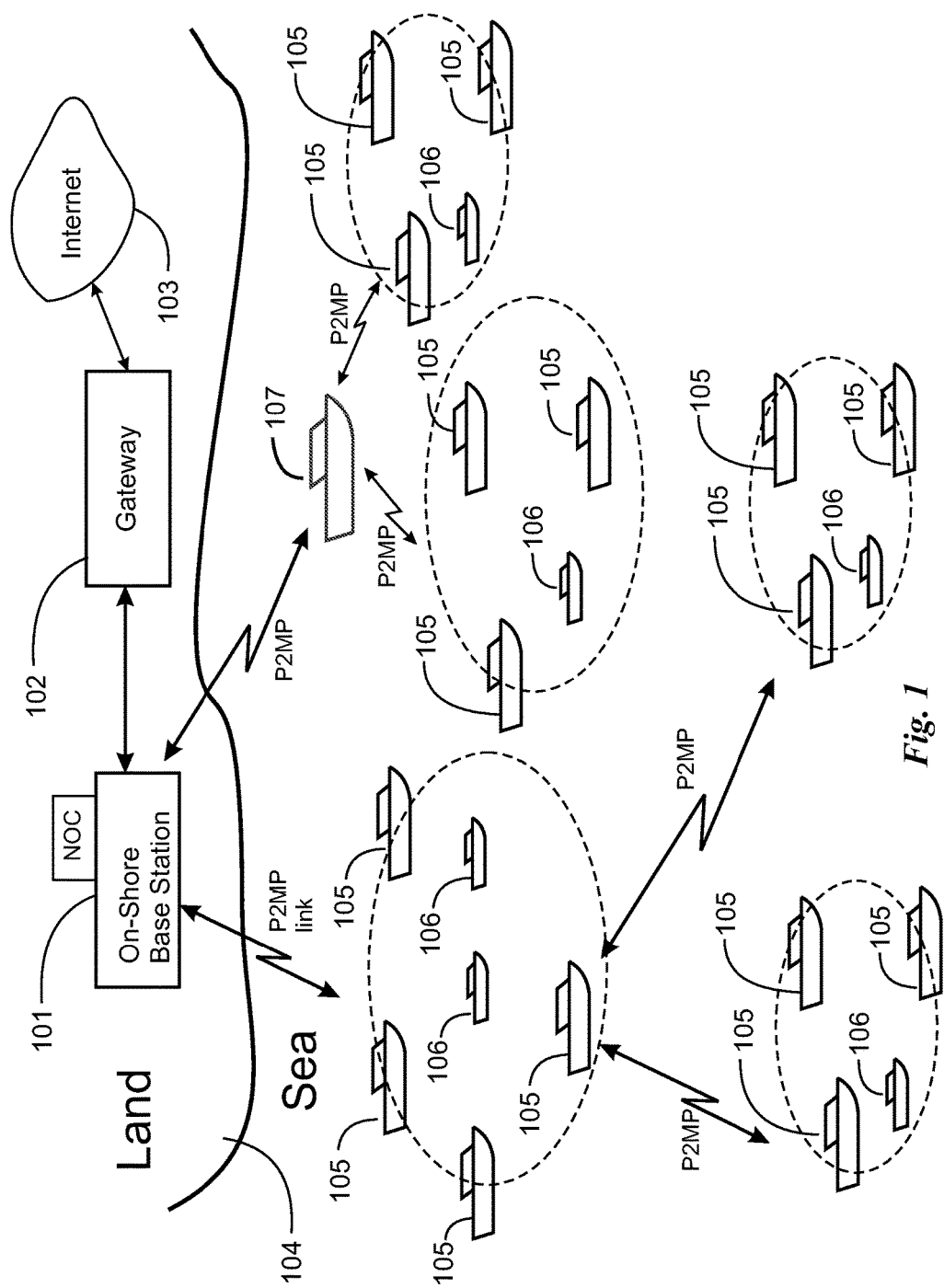
FIG. 1 is an architectural diagram of a network in an embodiment of the present invention.

In various embodiments and implementations of the invention described in specific examples below, with reference to figures filed with this application, a wireless communication system is provided as an effective and reliable way for fishermen to communicate amongst themselves and with the shore during emergencies and other times using text or email messages and voice calls. Video may also be supported. In various embodiments the system caters to near-shore circumstances, described as within 46 km, and also in other embodiments to groups of fishing boats at significantly greater separation from the shore.

There are a number of factors that contribute to the problem, which, of course, influence the nature of the system that solves the problem in different embodiments. These factors include:

Extreme mobility: Boats are free to move anywhere at any speed they can muster as opposed to constraints imposed on vehicles on a road.

Variation in density: Concentration of boats can be very dense around sea ports and in potential fishing zones and very sparse in some other regions. Spatio-temporal variation in boat density will bring in dynamic topology changes. This may bring in real-time complexity in routing the data Data rate variability: Depending on signal strength at a receiver, achievable data rate at a physical layer will vary significantly. Also, the data rate required by the fishing vessels will vary with respect to the density of the boats and the applications they use at any point of time Directional antenna beam: Directional antennas provide extended range. However, directional antennas need to reorient dynamically towards a base station as a boat changes direction. Frequent connectivity fluctuations may occur due to small diversions in the alignment of directional antenna. So tight reorientation of antenna is necessary Mobile base station: Usually base stations are static, and on shore. However, a moving boat can act as a base station.

Sea state variations: The stability of boats at sea depends on the sea state and this has a bearing on the stability of the wireless links that constitute the system.

The system of the invention in various embodiments comprises long-range Wi-Fi (LR Wi-Fi) base stations, antennas and transceivers on individual fishing boats compatible with the base stations, called hereinafter in this specification Adaptive Backhaul Equipment (ABE), and 802.11n wireless routers connected to the ABE on each boat. The ABE is a backhaul radio on board individual boats, with a built in antenna. The ABE is capable of full-duplex communication, and is adaptive in the sense that it can play the role of a gateway to the backhaul network or that of a mobile base station to extend the range of the backhaul network.

LR Wi-Fi is chosen based on a comprehensive comparative study of various backhaul options, such as 2G, 3G, Wi-Fi, Wi-MAX, Cognitive Radio and LTE, based on cost, communication range, operating frequency, vendor availability, bandwidth requirement, data rate requirement and latency effects.

Long-Range Wi-Fi technology is an adaptation of 802.11 standards to provide long distance connectivity using directional antennas and some tweaks to the physical and MAC layers of 802.11n (or ac) stack. A significant difference is replacement of the carrier-sense multiple access with collision avoidance (CSMA-CA)-based medium access with time-division multiple access (TDMA) having scheduled time slots for clients to eliminate collisions. In addition, various parameters such as acknowledgement timeout, slot size, etc., are tweaked in order to account for longer propagation delays in long-range Wi-Fi. Directional sector antenna of the base station, installed at an elevated location, ensures a fairly long line of sight to the nearest clients. The clients also employ directional sector antennas, mounted as high as possible, as a part of the client's ABE.

FIG. 1 is an architecture diagram displaying the dynamic architecture of the unique communication system of the invention in one embodiment. The network in this example is a hierarchical, multi-level point-to-multi-point (P2MP) network anchored at a base station 101 on shore. The on-shore base station 101 provides a first level P2MP network in the hierarchy. This first-level of the overall network provides guaranteed connectivity within its range as long as the base station is operational. This caters to the near-shore scenario for distances up to 40-45 km from the shore. In this example base station 101 is connected to Internet network 103 through a gateway 102. There is further a Network Operations Center (NOC) associated with the base station, which is described further later in this specification.

The overall network in any circumstance depends upon the number of boats with equipment compatible with the system, location of the boats, and differences in equipment and operational capability at each boat in the system. It may also be dependent on the directionality of the antenna in fishing boats.

In the operation of fishing boats, it is a natural occurrence that several boats may concentrate together in the vicinity of one or more schools of fish that may have been encountered by one boat, which may communicate the fact of fish activity to other boats. Over passage of time as well, individual boats may move from one cluster to another, and some may be in transit at any point in time. Cluster concentration is illustrated in FIG. 1 by icons representing boats in clusters represented by dotted ovals in FIG. 1, of which five are shown in this example.

In any instant example, there may be several kinds of fishing boats distinguished both by size, fishing equipment, and for the purpose of this disclosure, by communication equipment. The most important distinguishing characteristic for the network system is the nature of and the capability of the equipment on individual ones of the boats.

Some boats, indicated in FIG. 1 by element 105, comprise Adaptive Backhaul Equipment (ABE) distinguished by a directional antenna and radio equipment tuned to two-way communication with a base station over the P2MP network, which may be base station 101 on shore. The ABE is connected by Ethernet cable to a wireless router cum access point, called here an Access router. Smart phones, tablets and other such Wi-Fi-enabled devices on the boat connect to the Access router over standard Wi-Fi protocol. Boats so equipped and functional are called in this system Adaptive Nodes (AdN). These nodes may adapt to communicate in periods of time with the on-shore base station, and in other periods of time to act as base stations extending the range of the network further from the land base station 101.

Some boats have only an Access router, and no ABE. These boats are indicated by element number 106 in FIG. 1 and are termed Access Nodes (AcN). They cannot communicate with either an on-shore or a floating base station but can communicate with and through other boats that are within the WiFi range of the Access router.

Any boat within range of the land base station can serve as a range extender or a relay by providing a P2MP network further into the sea. For this purpose, such a boat comprises a second ABE also connected to the Access router. This second ABE plays a role of a mobile, floating base station. The network can be extended to any level opportunistically based on the availability of intermediate boats. Each additional level of range extension may add about 15-20 km to the achievable range. Boats so equipped in this embodiment are termed Super Nodes.

By incorporating delay tolerance at intermediate nodes, message delivery rates may be improved, albeit with a delay. As the density of boats at sea increases, as is typically the case near sea ports, the probability of locating a Super Node increases.

In this example, whenever the fishermen in a boat identify a fishing zone, they tend to pass on the message to their friends in the neighborhood using a code word. So a cluster of boats is formed naturally in the fishing zone, as described above, and the clusters are indicated in FIG. 1. In the architecture, the boats within a cluster form a wireless mesh network.

As described further above, some boats, such as mid-size trawlers, will have an Access router and one ABE, and are known as Adaptive Nodes (AdN). An AdN may operate as a node in conjunction with nearby nodes in the network, by being connected to the base station and also accessible by other boats through the Wi-Fi of the router but may also dynamically change its role to that of a mobile base station to extend the range of the overall network. In this case, the AdN may connect to the base station on shore through another AdN in its neighborhood, or directly, if within range. While some AdNs in a cluster will have their ABEs acting as gateways to the backhaul network, some AdNs will have their ABEs acting as mobile base stations to extend the range of the network. The ABE on an AdN can dynamically adapt itself to the appropriate role based on the current location of the boat and the needs of the network. When there are too many AdNs present in a dense cluster, a dynamically varying optimal subset of AdNs may be provisioned in the appropriate roles based on the location of the nodes and the received signal strength.

A Super Node (SuN) as described above can connect to the on-shore base station 101 and extend the range simultaneously. It does not need to be part of a cluster in order to do so. Each additional level of range extension will add about 15-20 km to the achievable range. By incorporating delay tolerance at the intermediate nodes, message delivery rates may be improved albeit with a delay.

Figure 2:
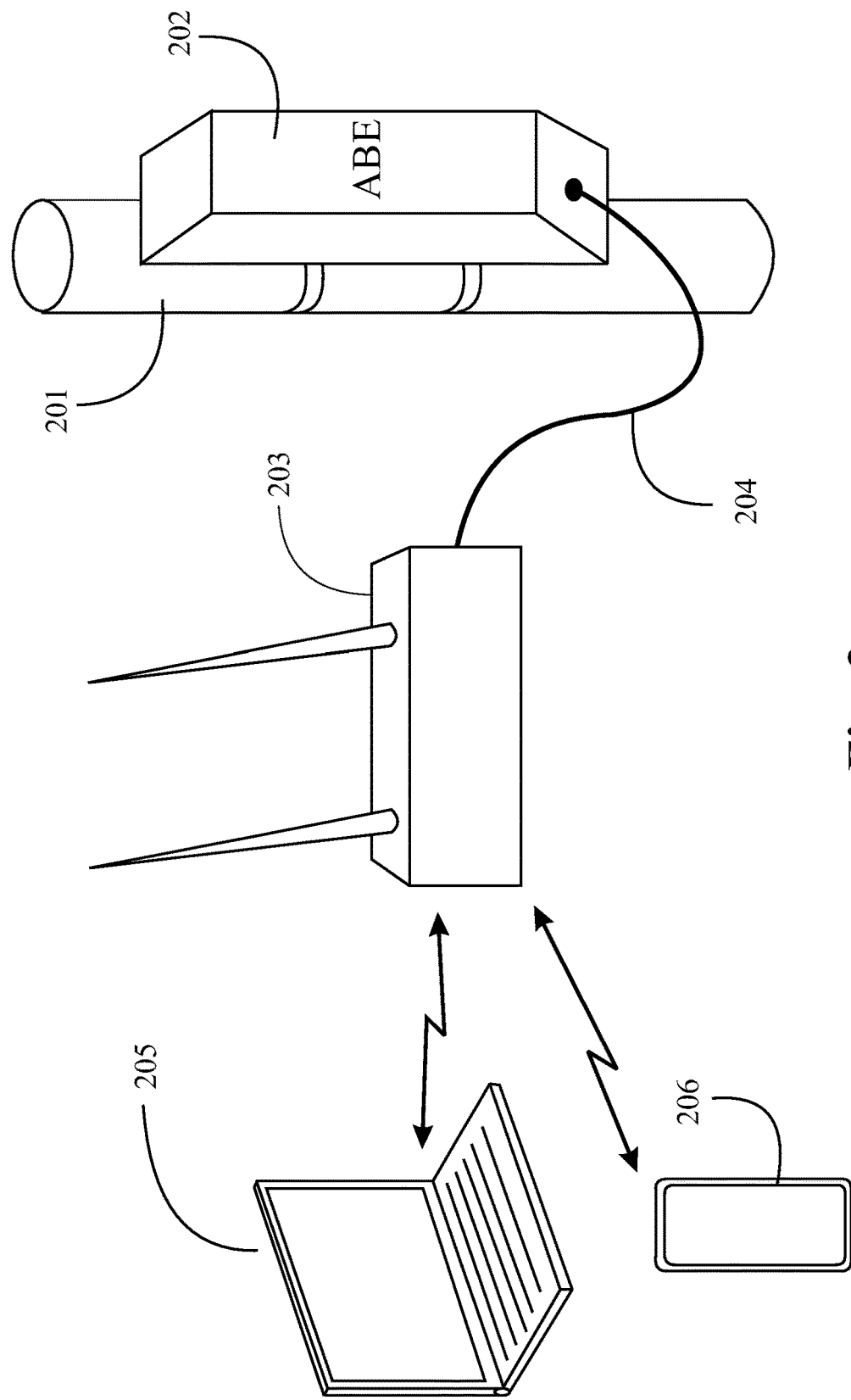
FIG. 2 is an illustration of equipment aboard a fishing vessel in an embodiment of the present invention.

FIG. 2 shows the equipment on board an Adaptive Node (AdN) in one embodiment. ABE 202 is coupled wirelessly to base station 101 (FIG. 1), or to another base station, such as a floating base station, over the P2MP LR Wi-Fi backhaul link. The ABE is also connected to Access router 203 by an Ethernet cable 204. End user devices (smart phones, tablets, laptops, etc.), such as smart phone 206 and laptop computer 205 connect to the Access router by standard Wi-Fi protocol. By connecting base station 101 on the shore to the internet, all the end user devices are internet enabled. They are able to access all the apps on their smart phones such as web browser, VoIP and messaging apps such as WhatsApp, YouTube, Skype, etc.

Part of the ABE of a node having a ABE is a directional antenna. Dynamic reconfiguration of the directional antenna can be implemented by mounting the antenna on a servo-motor-powered rotary platform driven by a microcontroller. The microcontroller may compute the reorientation angle based on location of the boat and the base station and may operate the servo motor to rotate the antenna accordingly. Trawlers are usually equipped with a GPS receiver. A suitable gyroscopic mounting to dampen the effect of undulations of the boat due to rough sea state may also be used. In order to keep costs low, this readjustment may be done manually also even though it may not give the best results.

A Network Operations Center (NOC) will be located as a part of the base station on shore for managing and monitoring the network. Further a hierarchy of NOCs at the sea port level, regional level, state level, central level, etc., may be provided. Several valuable services are provided in different embodiments of the invention by the NOC to benefit fishermen. The NOC is enabled to track the boats and ships in the region and to provide an early warning system for collision avoidance of fishing boats with ships. The NOC may also provide a timely alert to fishing boats to enable them to move out of danger. In addition, the NOC can detect intrusion of unauthorized fishing vessels, provide an alert to the fishing vessel when it goes near the maritime border, etc.

The network may also be used in different embodiments as a platform for enabling a wide range of services, such as e-health services, e-commerce services, for providing real-time weather alerts, entertainment, education, and much more. Providing internet access to fishermen on fishing boats at sea will go a long way towards improving the quality of life of the fishermen while they are at sea.

It will be apparent to the skilled person that a novel communication system may be established for cooperating fisherman, according to above description, by equipping their fishing boats with compatible equipment and connecting the on-board equipment with a base station, and that the resulting network may be established at several different levels.

At a first hierarchical level of such a network, individual boats may be equipped with ABEs and routers, the ABEs constituting directional antennas and transceivers, to be able to connect to the base station and to establish communication with other boats having Access routers but not ABEs in a nearby cluster. The boats with ABEs may be termed Adaptive Nodes. An Adaptive node may communicate directly with the base station by means of the directional antenna and may then serve as central nodes for separate clusters of other fishing boats, which may communicate through the Adaptive node to the base station and beyond. A special function of an adaptive node is to be able to switch between its function as a central node for a cluster, and as an extension node to other adaptive nodes in other clusters at a further distance from the base station, to extend the overall range of the network. To operate in this way, the adaptive node has to have periodic operation in each mode and must have caching of messages and the like to serve both functions. The switching and periodicity may be managed by the NOC at the on-shore base station according to need.

In a second hierarchical level some boats may be equipped as Super nodes, having two ABEs, one tuned full time to the base station, or to another Super Node, and the other to another adaptive node or Super Node further out in the network. A super node will have an Access router connected to its ABEs and may also serve as a hub for a local cluster, but this is not a requirement for a Super Node. A Super Node may be a relay base station positioned to hop communications further out into the backhaul network. A Super Node is one that can act as both a gateway to the backhaul network (to connect to the base station at the previous level) and a mobile base station (to provide the next level of P2MP hierarchy) at the same time. For this purpose, it is equipped with two ABEs connected over Ethernet to an Access Router.

It will be apparent that the nature and operation of a network in an embodiment of the present invention will be largely dependent on the number of subscribing fishing boats and upon the equipment and capability of individual ones of such boats. Given a set of equipped and cooperating boats operatives in a NOC at a base station may schedule and operate a network for that set of boats according to the capability set of the boats, and different boats may be assigned different responsibilities and tasks in the network, much of which will be transparent to the fishermen in the boats. One base station and operating center may thus operate more than one cooperative network of fishing boats, perhaps one for near-shore fisherman, and another for a group of fishing boats more intent on searching out lucrative fishing clusters further from shore.

A NOC is not limited to a base station but may also be implemented in a controller aboard one or more boats in a cluster, and more than one cooperative network of fishing boats may be configured either at a base station or on board a boat.

Some boats in a system as described above, such as boat 105 indicated in FIG. 1, comprise Adaptive Backhaul Equipment (ABE) distinguished by a directional antenna and radio equipment tuned to two-way communication with a base station over the P2MP network, which may be base station 101 of FIG. 1, on shore. In another aspect of the invention the inventors provide apparatus and methods to maximize the signal strength and bandwidth of the directional antenna.

One variable with which the system must contend is simply the direction of the antenna on the boat, to compensate for movement of the boat, including rotation of the boat as well as translation on the surface. The inventors provide an automatic antenna reorientation system to maximize signal strength.

Figure 3:
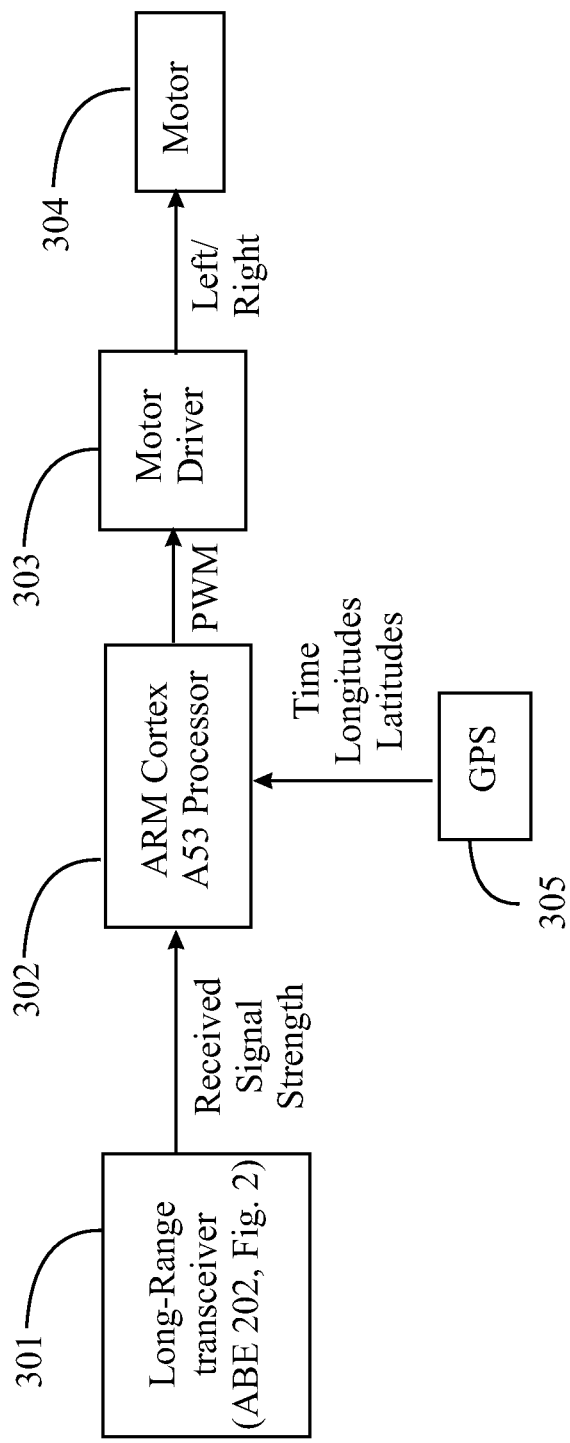
FIG. 3 is a block diagram of architecture in an embodiment of the invention.

FIG. 3 is an architectural diagram of the automatic antenna reorientation system in an embodiment of the invention, and FIG. 5 is a flow diagram describing functionality of the reorientation system. Referring to FIG. 3, the system comprises an ABE 202 mounted on a rotating platform, upon which the directional antenna is also mounted. An ARM-based processor 302 is a RISC-based microprocessor made by ARM holdings, as an example of a processor that may be utilized in this system. Processor 302 is coupled to ABE 202, to a GPS system 305, and to motor driver circuitry 303, which in turn drives motor 304, which may be in some embodiments a DC motor, and in some embodiments a stepper motor in micro-stepping mode. Motor 304 is driven clockwise and counter-clockwise to orient the antenna.

Processor 302 reads received signal strength, noise floor, Client Connection Quality (CCQ). GPS location of the base station and distance between the client (ABE 202 on the boat) and the base station from ABE 202. Based on these four parameters, an algorithm is developed. The algorithm decides at which direction the ABE 202 has to face in order to get the best signal quality.

Figure 5A:
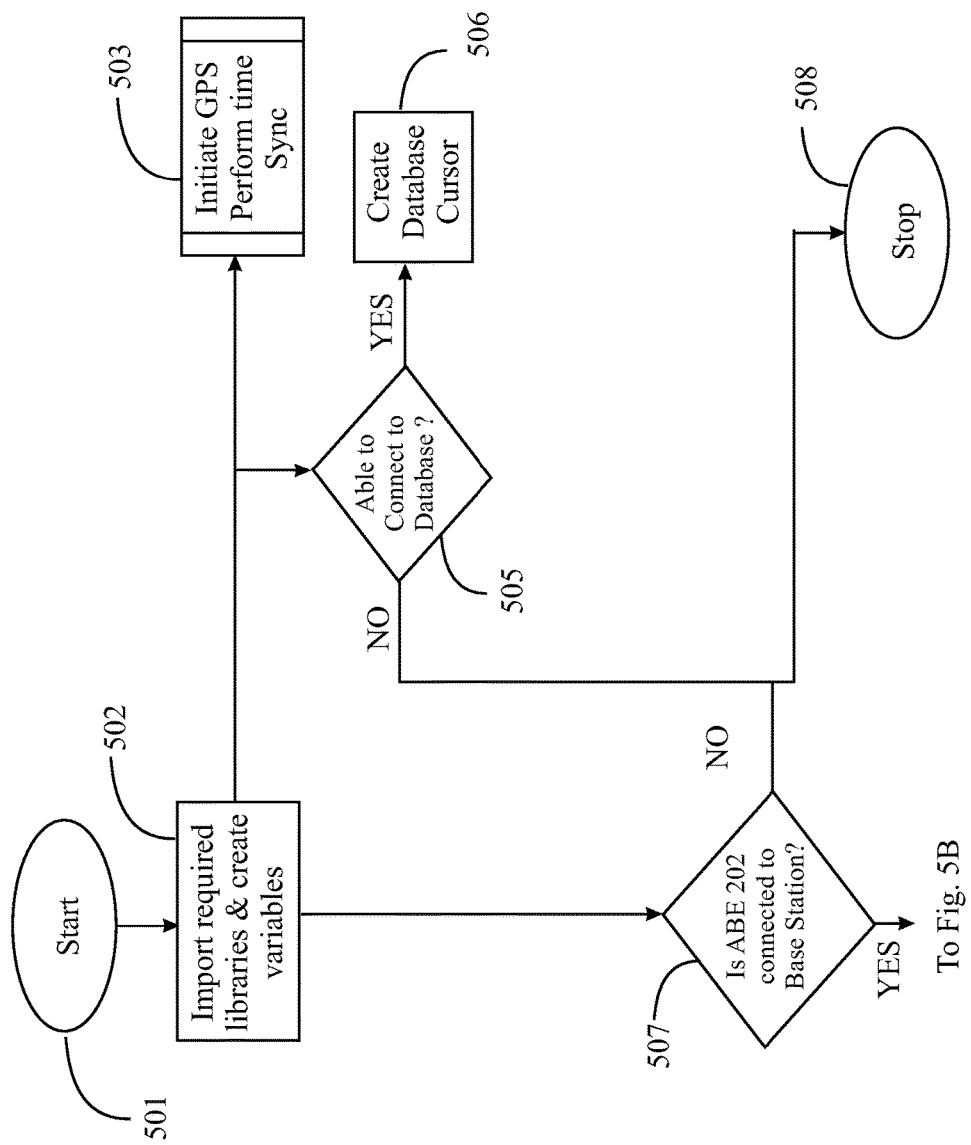
FIG. 5A is a first part of a flow chart for a process in one embodiment.
Figure 5B:
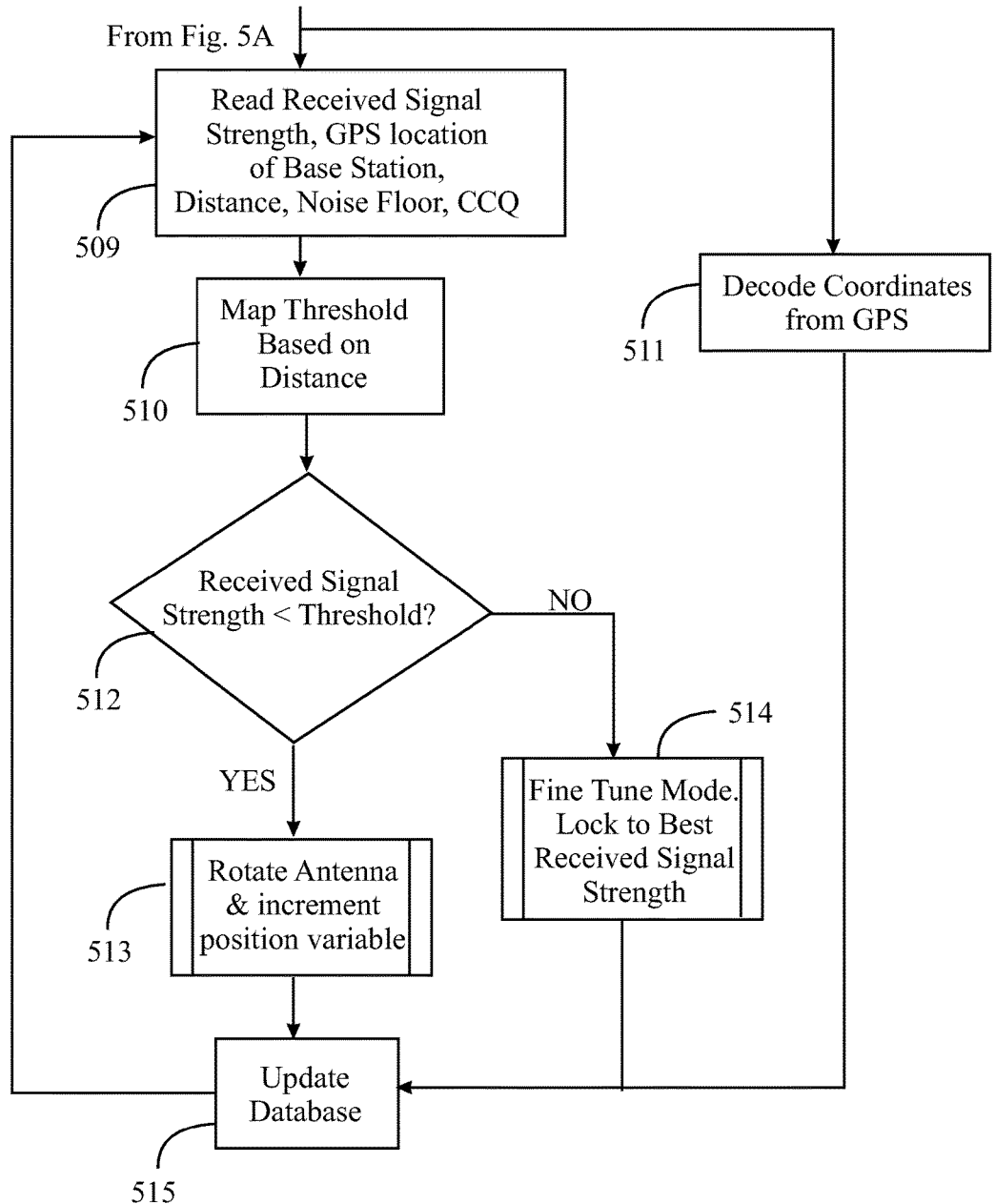
FIG. 5B is a second part of the flow chart with the first part in FIG. 5A.

FIGS. 5A and 5B constitute a flow chart detailing operation of the algorithm. Step 501 indicates a start of operation. At step 502 the processor imports required libraries and creates variables to be used in the algorithm. At step 503 the processor initiates the GPS system 305 and performs a time synchronization. At step 505 it is determined whether a connection to the database is established. If YES, a database cursor is created at step 506. If NO, then processing stops at step 508.

Once libraries are imported and variables are created. At step 507 the processor determines whether or not it is able to securely log in to the ABE 202 and whether the ABE is connected to the base station. If "YES" control goes to step 509, shown in FIG. 5B. If "NO" the process is stopped at step 508.

At step 509 the processor reads received signal strength, noise floor, Client Connection Quality (CCQ), GPS location of the base station and the distance between the client (ABE 202 on the boat) & base station from the ABE, and at step 511 the processor decodes coordinates from the GPS system, updating the database at step 515 and returning to step 509. At step 510 a received signal strength threshold based on distance is mapped. Then at step 512 it is determined whether the received signal strength is less than the threshold. If NO control goes to step 514 and a fine tune mode is accomplished to lock to the best received signal strength.

If the decision at step 512 is YES, that is, the value of the signal strength is less than the threshold mapped in step 510, at step 513 the antenna of ABE 202 is rotated to maximize signal strength. This process continues as the boat translates across the water surface and rotates relative to the direction to the base station, keeping the directional antenna in a changing position maximizing signal strength.

Figure 4:
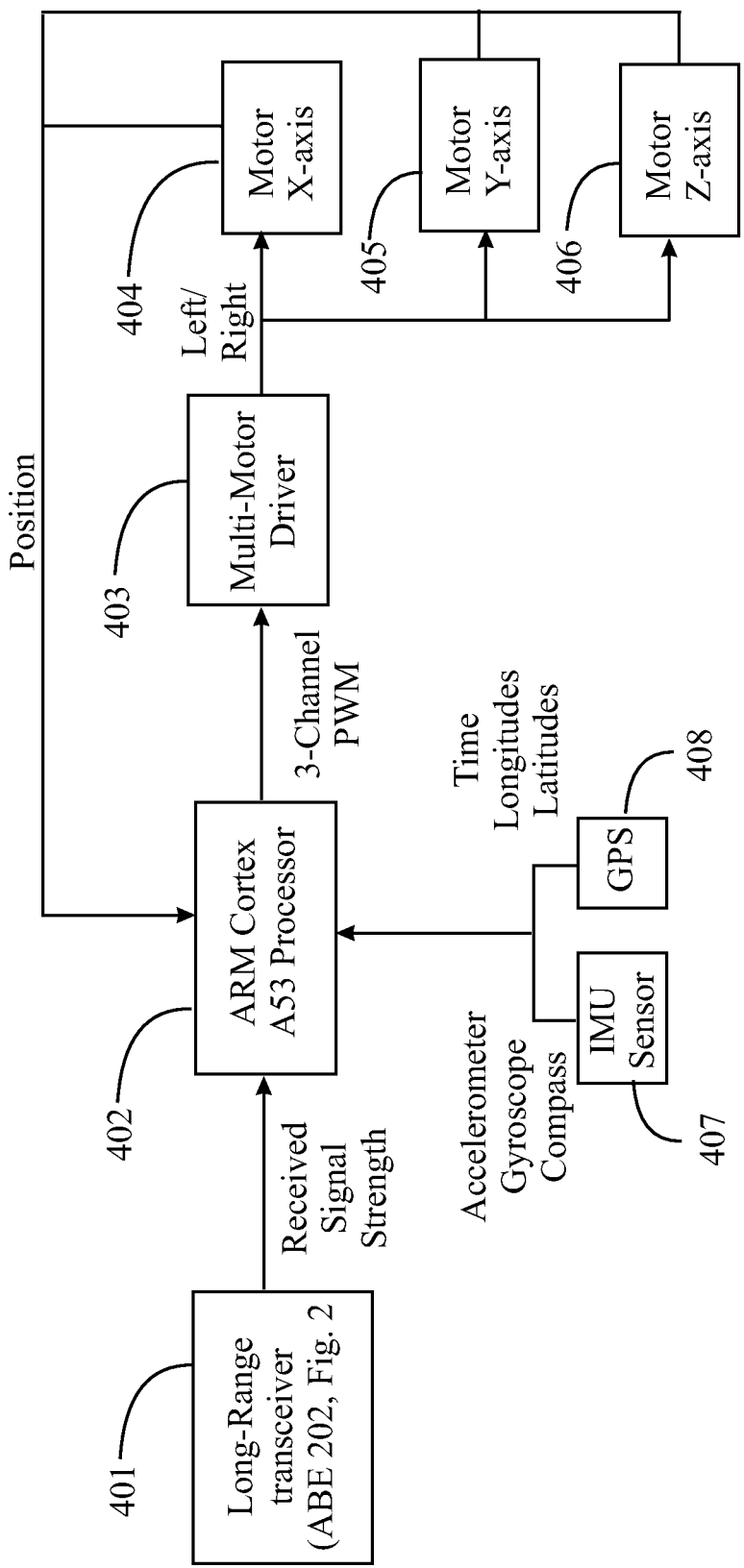
FIG. 4 is a block diagram of architecture in an alternative embodiment of the invention.

In another embodiment of the invention the inventors provide a system and method to compensate the directional antenna for pitch, roll and yaw due to wave and current action on the boat upon which the directional antenna is mounted. FIG. 4 is an architectural diagram for a system to adjust position of the directional antenna in response to pitch, roll and yaw. ARM processor 402, equivalent to processor 302 in FIG. 3, is coupled to ABE 202.

Processor 402 is also coupled to GPS circuitry 408 and to an inertial measurement unit (IMU) sensor 407 that comprises an accelerometer, a gyroscope and a compass. Processor 402 outputs signals in three channels, pulse width modulated (PWM), to a multi-motor driver 403. Driver 403 controls three motors 404, 405 and 406, one each for X, Y and Z axes for the directional antenna. Each motor feeds real-time position indication back to controller 402.

Figure 6A:
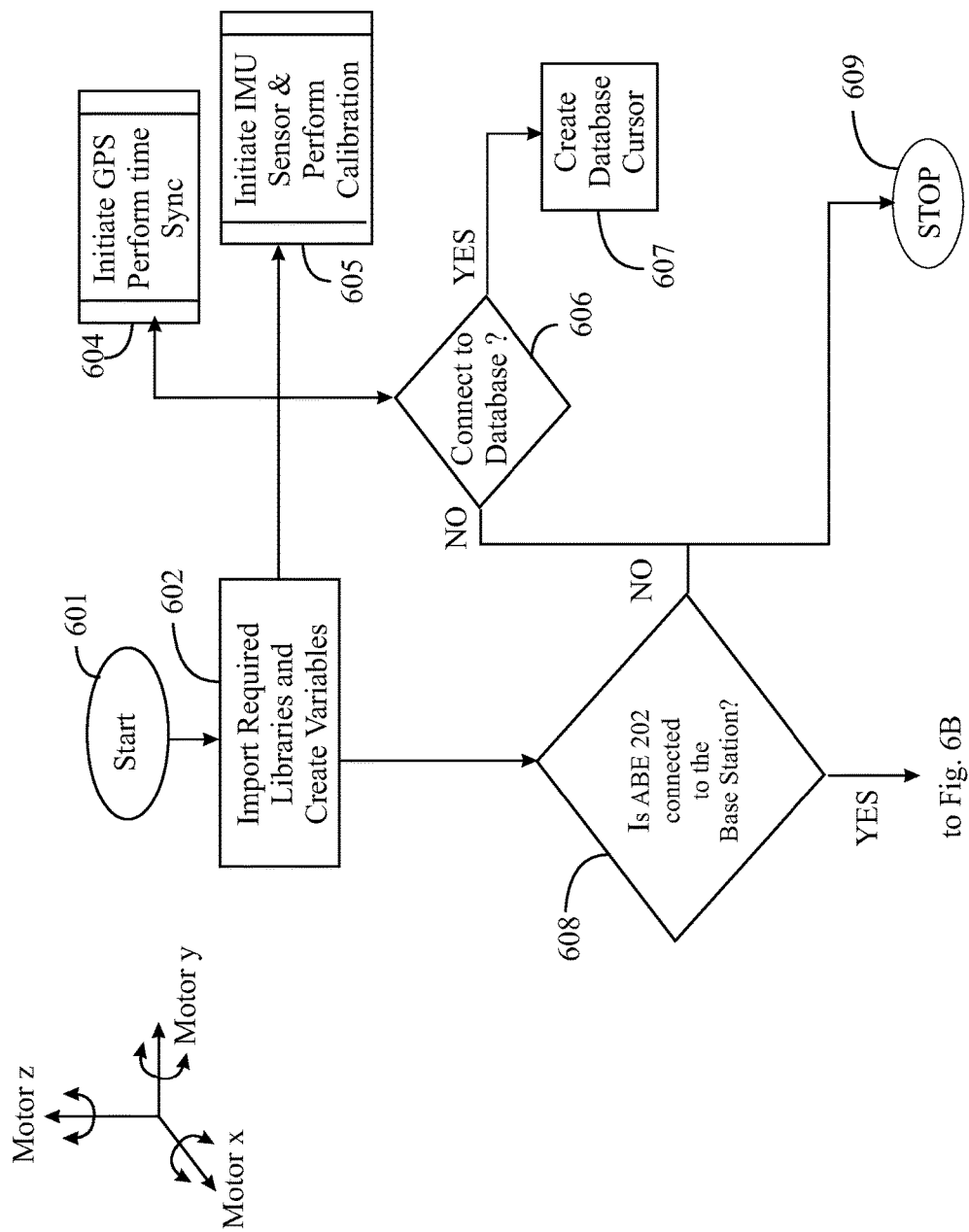
FIG. 6A is a first part of a flow chart for a process in one embodiment.

FIG. 6A is a first part of a flow diagram for operation of the correctional system for roll, pitch and yaw. At the upper left is a coordinate system indicating the effect of rotation of motors X, Y and Z. The process starts at step 601. At step 602 the processor imports required libraries and creates variables. At step 604 the GPS system is initiated and at step 605 the inertial measurement unit (IMU) system is initiated. At step 606 a determination is made as to whether a connection to the database is established. If YES, a database cursor is created. If NO, the process ends at step 609.

At step 608 a determination is made whether the processor is able to securely log in to the ABE 202 and whether the ABE is connected to the base station. If NO stops at step 609. If YES control goes to step 610 in FIG. 6B, where the processor reads received signal strength, GPS location of the base station, distance, noise floor and CCQ from the ABE 202. At step 612 the processor maps threshold based on distance. At step 614 a determination is made as to whether the received signal strength is less than the threshold determined in step 612.

If received signal strength is NOT less than the threshold, control is to step 615 to fine tune to best Received Signal Strength, and the database is updated at step 617. If received signal strength at step 614 is less than the threshold the antenna of ABE 202 is caused to be rotated. This is the Z adjustment, as in FIGS. 5A and 5B.

After step 610 the IMU inputs are consulted at step 611. If pitch is greater than a threshold value, motor Y is used to adjust for pitch. If roll is greater than threshold, motor X is used to adjust for roll. Position variables are appropriately incremented. If no adjustment is needed for either pitch or roll, control returns to step 610, and the loop repeats. If adjustments are made for pitch and roll, control again goes to step 610, and the loop repeats. The process continues, making real-time adjustments in the positioning of the antenna of ABE 202 in response to the defined variables.

Figure 6B:
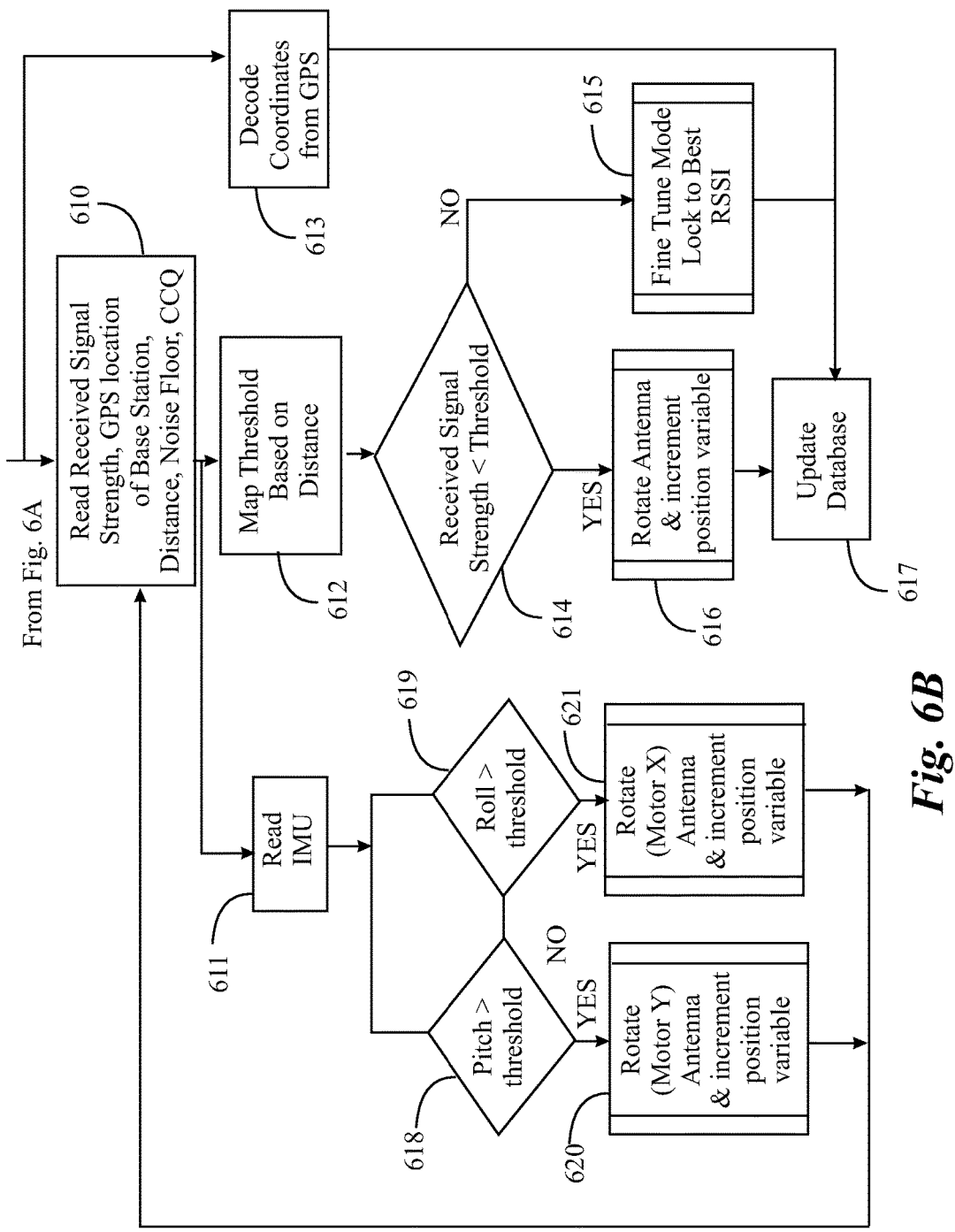
FIG. 6B is a second part of the flow chart with the first part in FIG. 6A.

In the process according to flow charts FIGS. 6A and 6B, all of the boats movements are taken into account, and the directional antenna rests on a platform movable in all three axes of a cartesian coordinate system.

It will be apparent that networks in different embodiments of the present invention may be fashioned using any combination of the equipment and functionality described above, and that the embodiments described above are meant to be examples of a broader invention, and not to establish limits to the invention. The breadth of the invention is established only by the claims below.

The invention claimed is:

1. A method for maximizing signal strength between a land-based or moving first station and a moving second station on a sea-going vessel, comprising:
    mounting an antenna on a structure on the moving second station, the structure rotatable about a vertical axis by a mechanism powered by an electric motor;
    initiating a data connection between the land-based or moving first station and the moving second station by a processor in communication circuitry at the moving second station;
    reading a received signal-strength by the processor; and
    operating the electric motor by the processor, rotating the rotatable structure, maximizing the signal strength.

2. The method of claim 1 further comprising determining distance between the land-based or moving first station and the moving second station by comparing location of the moving second station according to GPS circuitry coupled to the processor at the moving second station, to the location of the land-based or moving first station.

3. The method of claim 2 further comprising determining rotation direction to increase received signal strength, based at least in part on stored results of previous adjustments.

4. The method of claim 1 further comprising enabling the structure to be adjusted by electric motors driving a mechanism capable of adjustment in three cartesian axes, monitoring an accelerometer and a gyroscope coupled to the processor at the moving second station, using readings to determine pitch and roll of the moving second station, and driving the motors to compensate for pitch and roll determined.

5. A system for maximizing signal strength between a land-based or moving first station and a moving second station on a sea-going vessel, comprising:
    a fixed or rotatable antenna at the land-based or moving first station;
    an antenna at the moving second station mounted on a structure rotatable about a vertical axis by a mechanism powered by an electric motor; and
    control circuitry at the moving second station having a processor coupled to drive circuitry coupled to the electric motor;
    wherein the control circuitry initiates data communication between the moving second station and the land-based or moving first station, determines signal strength, and causes the antenna to rotate by driving the electric motor, maximizing the signal strength.

6. The system of claim 5 further comprising GPS circuitry coupled to the processor at the moving second station, wherein distance between the land-based or moving first station and the moving second station is determined by comparing location of the moving second station according to GPS circuitry, to the location of the land-based or moving first station.

7. The system of claim 6 further comprising stored results of previous adjustments, wherein rotation direction to increase received signal strength is determined based at least in part on the results of previous adjustments.

8. The system of claim 5 further comprising electric motors driving a mechanism capable of adjusting the structure around three cartesian axes, and an accelerometer and a gyroscope coupled to the processor, wherein pitch and roll of the moving second station is determined using readings from the accelerometer and the gyroscope.

* * * * *